OR 2,929,062

6 X5371E X5013H

X 370-38

T.V. claimed SD

SEARCH ROOM

AUTOMATIC FREQUENCY-COMPENSATED GAIN CONTROL FOR MULTI-CHANNEL TELEVISION DISTRIBUTION LINES

Filed Aug. 29, 1955 5 Sheets-Sheet 1

INVENTOR
FORREST E. HUGGIN
HENRY M. DIAMBRA
WARREN E. DIDRA
BY Max L. Libman
ATTORNEY INVENTOR
FORREST E. HUGGIN
HENRY M. DIAMBRA
WARREN E. DIDRA
BY Max L. Libman
ATTORNEY INVENTOR
FORREST E. HUGGIN
HENRY M. DIAMBRA
WARREN E. DIDRA
BY Max L. Libman
ATTORNEY

INVENTOR
FORREST E. HUGGIN
HENRY M. DIAMBRA
WARREN E. DIDRA

BY Max L. Libman
ATTORNEY

March 15, 1960 F. E. HUGGIN ET AL 2,929,062

AUTOMATIC FREQUENCY-COMPENSATED GAIN CONTROL FOR MULTI-CHANNEL TELEVISION DISTRIBUTION LINES

Filed Aug. 29, 1955 5 Sheets-Sheet 5

INVENTOR
FORREST E. HUGGIN
HENRY M. DIAMBRA
WARREN E. DIDRA

BY Max L. Libman

ATTORNEY 2,929,062
Patented Mar. 15, 1960

2,929,062

AUTOMATIC FREQUENCY-COMPENSATED GAIN CONTROL FOR MULTI-CHANNEL TELEVISION DISTRIBUTION LINES

Forrest E. Huggin and Henry M. Diambra, Washington, D.C., and Warren E. Didra, West Hyattsville, Md.; said Diambra assignor to Citizens Bank of Maryland, Riverdale, Md., and Small Business Administration, Richmond, Va.

Application August 29, 1955, Serial No. 531,238

3 Claims. (Cl. 343—205)

This invention relates to an automatic gain control system for use primarily in a multi-channel high frequency distribution line such as is used in television community antenna systems. In such distribution systems, a master antenna is set up in a suitable elevated location for receiving television signals from a nearby town or towns; these signals, including all of the channels available in the area, are amplified and transmitted on a closed coaxial cable circuit to the individual users in the community. It is usually necessary to employ several miles of transmission cable between the master receiving antenna site and the community to which the signals must be distributed. Since the cable is not a perfect conductor, the signals are attenuated in transmission, and must be reamplified at spaced points on the long cable. Furthermore, the attenuation is not constant for all frequencies, and therefore each of the transmitted channels has a different attenuation per unit of cable length.

The purpose of all community television systems is to provide constant amplitude signals into a customer's home regardless of variations of signal strength at the antenna, line voltage variations, or variations in attenuation of coaxial cables. Variations of signal strength at the antenna site can be taken care of by automatic gain control at the head-end site. But, up until now, there has been no complete solution for variations in the attenuation of coaxial cables used for distribution. Temperature variations are the greatest cause of changes in the attenuation of coaxial cables which are used for distribution of television signals by a community system. It has therefore become necessary to provide some means of correcting for these excessive changes.

Using RG–11 cable, a usual type of cable used by many community television systems, the attenuation per mile on channel 6 will increase approximately 16 db if the temperature of the cable increases from 0 to 120 degrees F., which is normal winter-to-summer variation. Since the RG–11 cable has a black vinyl jacket and is installed on poles, subjected to direct sunlight, the internal temperature will be many degrees higher than the outside air temperature. In addition, the insulating properties of the jacket will cause a time delay of several hours for the interior to reach the maximum temperature. This same effect takes place upon cooling and minimum cable temperature is reached several hours after the minimum air temperature. Because of this time delay, it is therefore not feasible to devise means for controlling gain of line repeater amplifiers directly by outside air temperature.

Since the attenuation of channel 2 is only about 80 percent of that of channel 6, variation in the attenuation of the cable will cause a change in the required amount of equalization. In a normal system, equalization is fixed; and, therefore, any changes in attenuation will upset the equalization, causing what is known as "tilt." With a temperature increase from 0 to 120 degrees, the "tilt" between channels 2 and 6 can be as great as 3 db per mile. Therefore, it becomes necessary to provide also some means for automatically correcting for "tilt." For example, under these conditions if the trunk line is ten miles long, the attenuation increase on channel 6 will be approximately 160 db and tilt between channels 2 and 6 will be approximately 30 db, caused by the temperature change alone. This, of course, is more than enough to make the system inoperative. It can be seen that all corrections cannot be made at the end of the line because the signal will have been completely and totally lost by this time, and obscured by noise long before it reaches the end.

The attenuation of RG–11 at 67 degrees F. is approximately 40 db per 2000 feet on channel 6. Using broadband repeater amplifiers having 40 db gain on channel 6, approximately three amplifiers will be required per mile, or with the above example of a ten mile trunk line, a total of 30 amplifiers. One solution to the problem of attenuation change in the cable would be to require each of the line amplifiers to have some built-in device to maintain its output level constant regardless of the amplitude of the input signal. Such a device would be unnecessary in each amplifier, however. It will therefore be desirable to let the variation accumulate and then correct before the signal becomes either too large or too small to be corrected. As a system is normally set up, the input to each amplifier is approximately 1 mv. or 0 db. A low noise amplifier can accept a 16 db reduction in signal from this value and still be well above noise, so only every third amplifier need have a correcting device.

There are several methods which can be used to control the output level of the broadband line amplifiers. One of these methods is the so-called composite AGC. In this method, a bias voltage proportional to the sum of all signals in the pass band is developed at the amplifier output, and this voltage is used to control one or more tubes in the amplifier. One disadvantage of this method is that the system gain varies with the number of channels in the pass band (it is possible for the gain of one amplifier to increase over 20 db if the number of channels changes from 5 to 1). Another disadvantage is that it provides no intelligence for tilt correction. Therefore the composite AGC does not fulfill the requirements.

It is a major object of the invention to overcome the above and other disadvantages of known AGC systems. This is accomplished by the use of two peak-reading devices, tuned to the outside channels; the voltage from these pick-offs are used to control the output level as well as to provide tilt information and correction.

In order to determine the requirements of a five-channel broadband self-correcting amplifier it is necessary to consider the entire system to discover how it is affected by all disturbing factors. At the antenna site, the head-end amplifiers and/or converters must contain an AGC so that all output channels are fixed in level and tuned to channels 2 through 6. These five channels are mixed and applied to the coaxial cable. The output level of the mixer is such that over 2000 feet of RG–11 cable can be installed between the head-end and the first repeater amplifier and still have a level of at least 1 mv. The amplitudes of each channel at the head-end are adjusted so that they are all of equal level at the input to the first broadband repeater amplifier. This amplifier is equalized so that the signals to the input of amplifier #2, 2000 feet down the cable, are also equal, and so on to amplifier #3, which will be self-correcting according to the invention. Since there is approximately one mile of cable between the head-end and the AGC amplifier, the signal levels into this amplifier will vary with temperature. The attenuation is greater on channel 6 than on channel 2. Therefore, when the total line attenuation changes, the change will be larger on channel 6 than on channel 2. If the system is set up at a given temperature, then the temperature rise increases the attenuation more on channel 6 than on channel 2. If the above-referred to mile of cable were subjected to a 120 degree temperature rise, the attenuation on channel 6 will increase 16 db and on channel 2 will increase 13 db, causing a tilt of 3 db and a loss of 16 db.

Experimental tests on cables of different manufacturers have shown that variation of tilt can be more or less than the expected amount from the above value, but in all cases the greatest changes in attenuation occur at the outside channels with approximately a linear variation between. Of course, some cables have small bands of very high attenuation in the required frequency range which are referred to as "notches," but these cables are considered bad before installing and therefore rejected. The small irregularities remaining in the cables in use do not seem to get worse with temperature cycling. Therefore, to correct for tilt, it is necessary only to measure the difference between channel 2 and channel 6 and use this difference to alter the response of the amplifier to make the outputs equal. In a practicable installation, the self-correcting amplifier must have a gain of at least 56 db and be able to tilt its response curve 3 db either way. The time constants of the correcting device can be quite slow because they correct for temperature changes, and indeed they must be slow to make a stable system.

The specific nature of the invention as well as other objects and advantages thereof will clearly appear from a description of a preferred embodiment as shown in the accompanying drawings, in which.

Figure 1:
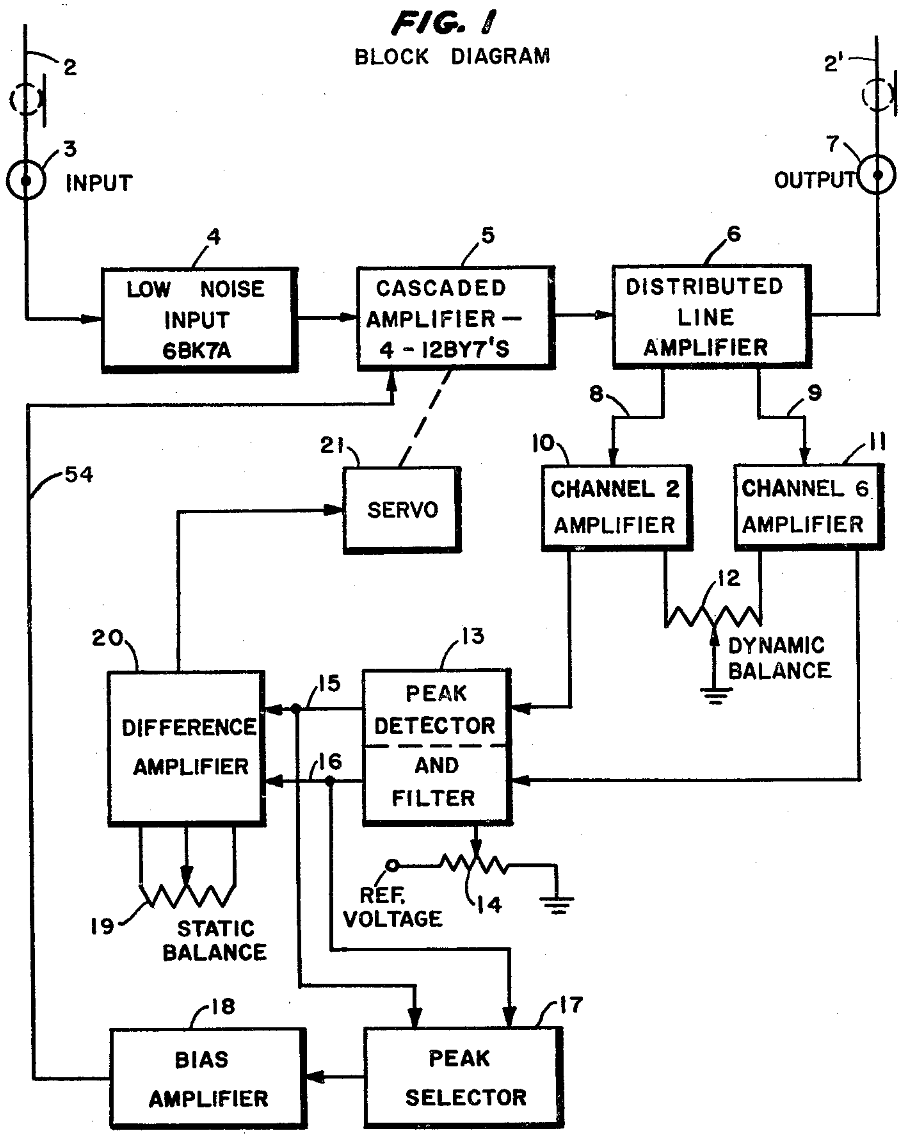
Fig. 1 is a block diagram showing the principle of operation of the system.

Referring to Fig. 1, the central conductor of the coaxial cable transmission line 2 is connected to input terminal 3, which leads to low-noise input amplifier section 4. This section, as will be shown in detail in Fig. 2A, consists of two cascaded broadband grounded grid triodes with a flat response over the passband to obtain a low noise figure. Following the input section is a cascaded amplifier section 5 comprising four broadband cascaded pentodes connected in a stagger-damped, double tuned circuit to obtain maximum gain and minimum bandwidth shrinkage. The final pentode of this group (see Fig. 2A) uses the grid line of the distributed line output stage 6 as a plate load. Output stage 6 is a distributed line amplifier which provides high level output signal with low intermodulation distortion and also provides a means of picking off the required AGC signals without distorting the signal from the amplifier. This combination of broadband cascade stages followed by a distributed line output has many advantages, among which are low noise input, high level output, easy control of frequency response, and economy of tubes. The output of the distributed line amplifier is supplied at output terminal 7 to cable 2′, which is a continuation of transmission line cable 2, so that cable 2′ transmits, in suitably amplified form, the same signals as cable 2. In order to control the gain of the above described amplifier arrangement, signals are picked off from distributed line amplifier on lines 8 and 9, to the respective amplifiers 10 and 11. Amplifier 10 is tuned to channel 2 frequency and amplifier 11 to the frequency of channel 6. As will be seen in Fig. 2C, the grids of the respective amplifiers 10 and 11 are connected to the plate line of distributed line amplifier 6 in such a manner as to extend the line by two sections, thereby causing negligible loss or discontinuity. Each of these amplifiers is of single stage construction and the plate circuits of the respective stages are tuned to channel 2 and channel 6, respectively. A dynamic balance control 12 is provided to enable differential gain adjustment between the two amplifiers to be made. This is necessary because any mismatch in the cable following the amplifier will be reflected back into the plate line causing a difference in signals on channels 2 and 6. The respective R.F. outputs from amplifiers 10 and 11 are fed into a double peak detector and filter system 13, which is provided with a level control 14 which may be a potentiometer or any other similar volume control arrangement. As will be seen in Fig. 2C, this circuit comprises a twin diode biased by means of potentiometer 14 to a suitable operating voltage. The voltage output of the rectifier arrangement will be zero until the peak of the R.F. signal exceeds the voltage set on potentiometer 14. Since the detector in 13 is followed by a filter with a long discharge time constant, the voltage will charge up to the peaks of the highest amplitude periodic signals received, which are the synchronizing pulses of the respective channels. The peak selector 17, which is another double diode, similar to that employed in 13, selects whichever D.C. level is the larger, and this voltage controls the bias amplifier 18, the output of which controls the gain in cascaded amplifier 5 so as to maintain the output on terminal 7 at a fixed value for the highest signal received. However, as explained above, it is also desirable that the gain of the amplifier for both high and low frequency signals should be further controlled so as to compensate for the variable frequency attenuation above described. In order to accomplish this, the two D.-C. voltages from the filters in unit 13 which were fed, as above described, to peak selector 17, are also fed to differential amplifier 20. This amplifier is normally balanced for zero output, by any suitable means indicated as a static balancing potentiometer 19, so that when the input from the respective channels are equal, there will be no output. A difference in amplitude of the incoming signals, however, will energize a polarized relay or other suitable mechanism to operate a servo mechanism 21 which in turn adjusts the "tilt" of cascaded amplifier 5 so as to favor the channel having the lower amplitude and thus compensate for the variable attenuation in the line due to frequency effects. In the practical arrangement of Fig. 2D, a reversible servo motor is used at 21 which through a mechanical link adjusts the tuning of the interstage transformer between cascaded pentodes in amplifier 5 to change the response of the amplifier so that channel 2 can be made 3 db higher than channel 6, or channel 6 made 3 db higher than channel 2. The phase relation is such that the servo always tries to keep channel 2 and channel 6 equal. The motor drives the transformer core through a stepped-down gearing chosen to give a very slow response, for example, twelve minutes to travel from one limit to the other, since the tilt correction is required only to follow changes caused by temperature, and the servo response at this rate is sufficiently rapid for the purpose.

The performance of the system is such that a 10 db change in the input causes a 1 db change in the output, and the difference between channel 2 and channel 6 will be maintained less than ½ db.

Figures 2, 2A:
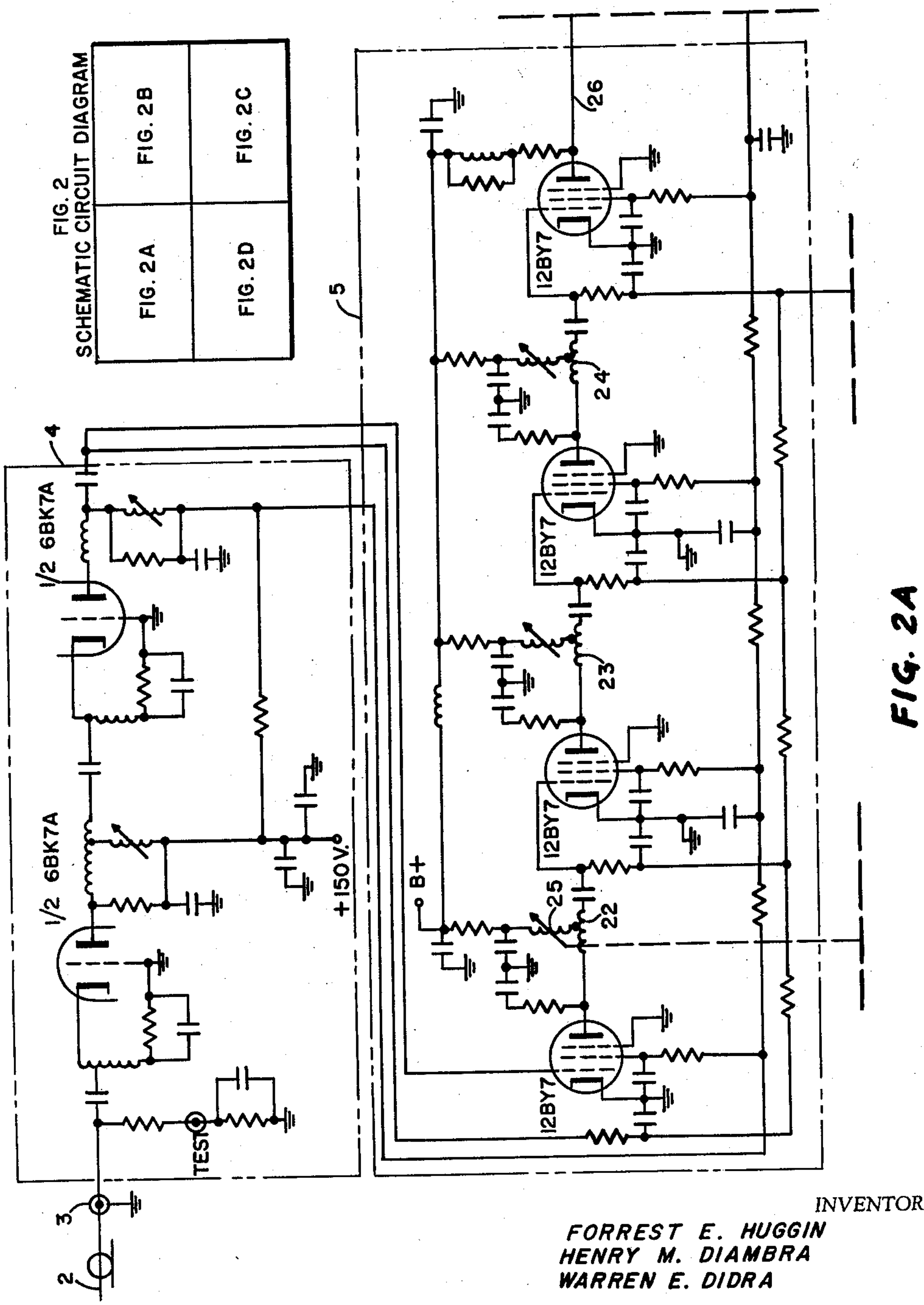
Figs. 2A to 2D are schematic circuit diagrams showing the circuit details of the same system.
Figure 2B:
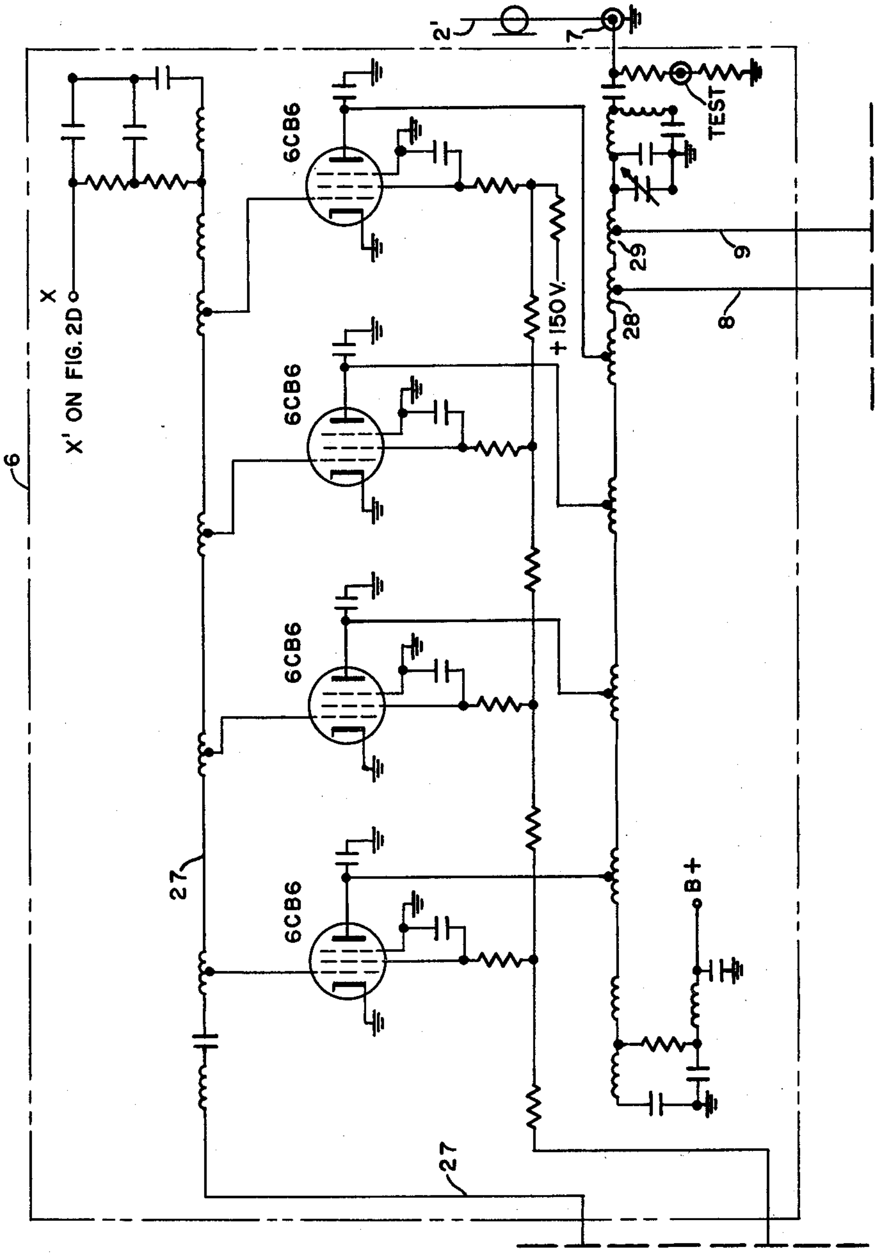
Figure 2C:
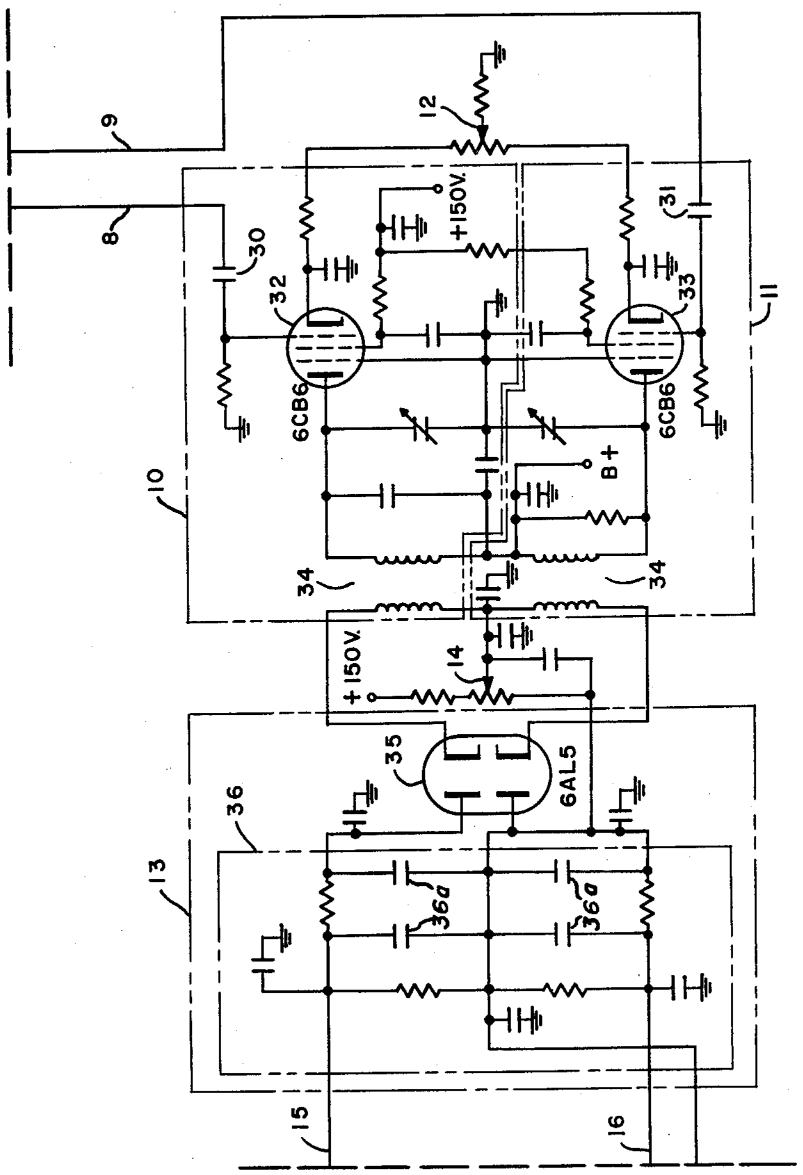
Figure 2D:
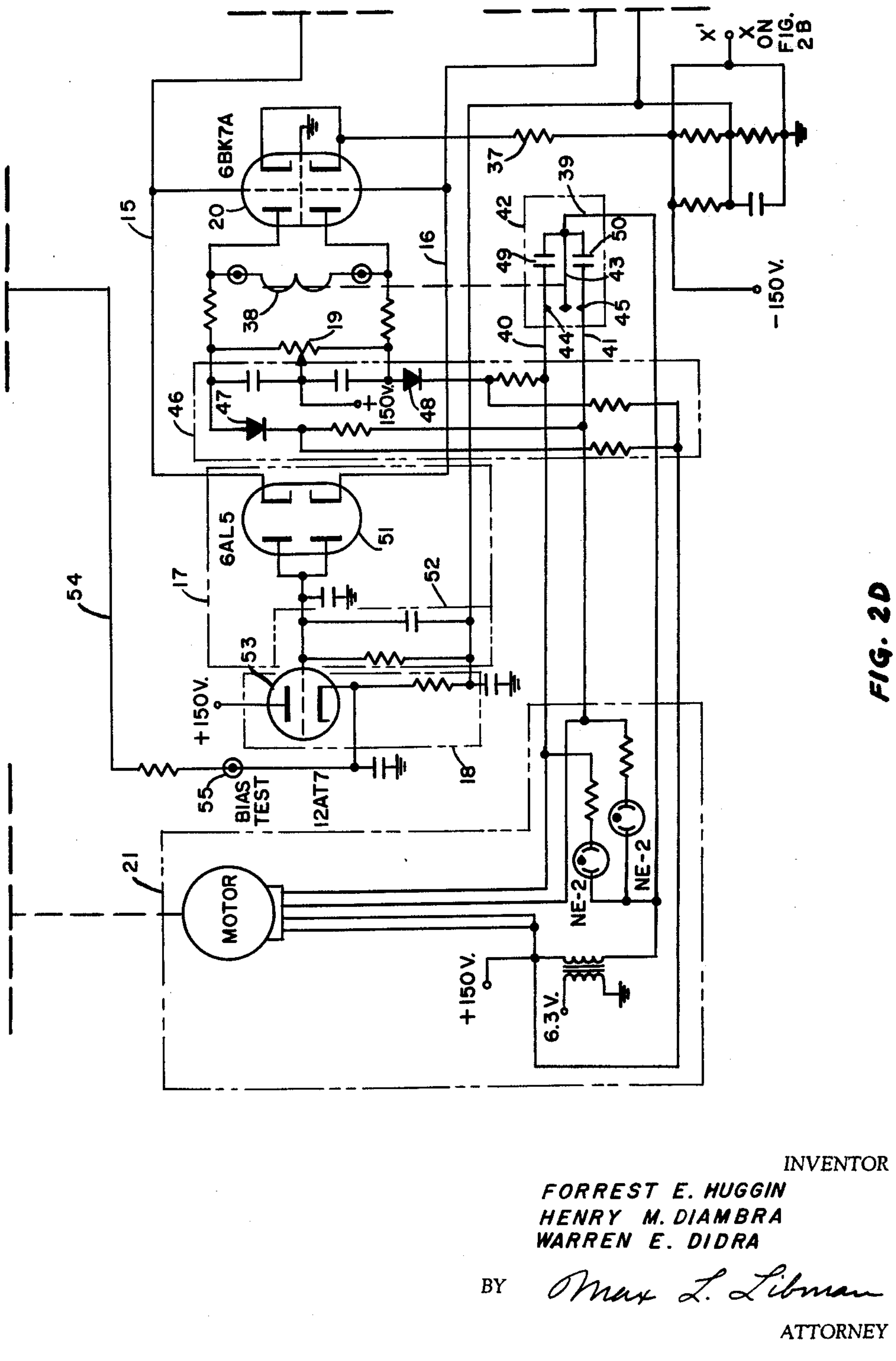

Referring to Fig. 2, the same circuit is shown in conventional schematic detail. Between input terminal 3 and output terminal 7, the blocks 4, 5 and 6 are indicated in outline form in Fig. 2. All of the components specifically designated in Fig. 1 are given the same reference characters in Fig. 2, so that the relationship of the two figures should be readily apparent. The vacuum tube types designated are those used in a practical embodiment of the invention, but it will be understood that other types and other circuits may be used within the spirit of the invention. It will be seen that section 4 is a straight-forward two-stage, low noise amplifier employing two cascaded triodes with grounded grid circuitry for minimum inherent noise figure. Cascaded amplifier 5 is also a straight-forward RF amplifier comprising four cascaded pentodes which are transformer-coupled in a stagger-damped arrangement, i.e., the stages are alternately over coupled and under coupled to produce alternately a double-humped response curve and a single-humped response curve, so that the overall frequency response has a suitably wide passband for carrying all channels, as is well-known. It will be noted that the interstage transformers 22, 23, 24, are actually T-connected, with their primary and secondary conductively coupled to each other and to a third mutual inductance winding (e.g., 25), which is variable to control the degree of mutual inductance coupling between the primary and secondary. This is done only as a matter of practical convenience in fabricating the transformers and to avoid the necessity for designing or purchasing special transformers.

The plate output of the last 12BY7 stage, 26, of cascaded amplifier 5 is used to drive the grid line, 27, of distributed line amplifier 6, which is generally of standard design shown as using 6CB6 tubes. Two inductive sections, 28 and 29, at the output end of the plate line provide pickoff points for conductors 8 and 9 (see also Fig. 1) used to feed the selective channel amplifiers 10 and 11 respectively. Since the output terminal 7 is still further down on the plate line, in order to avoid the effect of electrical discontinuities on the plate line at the pickoff points 8 and 9, the input capacities of the pickup tubes should be made to have the same capacitive value as the plate circuit. This is done by choosing the value of coupling condensers 30 and 31 so as to make the coupling condensers plus the input capacitance equal to the plate output capacitance of the other tubes. This value, in the circuit of Fig. 2, comes out to be 6.8 mmf. for each condenser. Condensers 30 and 31, in series with each grid circuit of tubes 32 and 33 respectively, form, in essence, a series capacitive voltage divider so that the overall or apparent capacity of the distributed plate line is exactly equal to the capacity represented by one of the plates in the previous groups; i.e., the plate line up to the pickoff point is active, and beyond this point comprises a couple of synthetic sections. Thus, the sampling voltages are picked off at points such that maximum advantage is taken of the gain of the amplifier, but without appreciably affecting the output of the system at terminal 7, and without the need to introduce a further amplifier ino the sampling circuit, with attendant complications.

Leads 8 and 9 are coupled to the grids of tubes 32 and 33 respectively, the plate circuits of which are tuned to channels 2 and 6 respectively, and the respective outputs are transformer coupled for D.-C. isolation at 34 to the respective cathodes of double diode 35, which is a double diode rectifier. The D.-C. outputs of the respective plates of double diode 35 are fed to the double peak detector and filter 13. These outputs represent the rectified carriers of the two channels, and are fed to the double R–C filter system 36. A fixed positive voltage is fed to potentiometer 19 (see also Fig. 1) which functions as a level set for the peak detector, so that rectification occurs only when the respective RF carrier voltages rise above the level determined by the setting of potentiometer 14. It should be noted that the band width of the tuned circuits in sections 10 and 11 is made considerably narrower than the band width of other tuned circuits in the system so as to utilize primarily the video carrier information, since the best voltage reference for the selected channels (e.g., channels 2 and 6) is provided by the synchronizing pulses of the video carriers and particularly by the vertical synchronizing pulses, which are wider than the horizontal synchronizing pulses and so contain more energy. Since the synchronizing pulse amplitude is required by law to be maintained at a fixed level, these values provide the best sampling reference points, and as they are the highest amplitudes found in a given carrier signal, by using a peak detector as shown, biased off so as not to respond appreciably to the figure signals, the desired reference voltages can be obtained which are related to the amplitudes of the respective carrier signals.

The time constants of the peak detector and filter circuits 13 are made sufficiently large so that narrow noise bursts, due to their short duration in the selected frequency ranges, do not supply sufficient charge to the 1 microfarad condensers **36*a*** to produce a significant signal. Only a continuous noise signal will affect the output significantly, and the most disturbing continuous noise signal likely to be encountered in practice is due to continuous duty corona on power lines which the TV transmission line must sometimes parallel. However, if this is sufficiently bad to affect the AGC system, it is generally sufficiently bad so that a useful picture cannot be obtained in any case.

The outputs of the peak detector and filter 13 are fed on lines 15 and 16 respectively to difference amplifier 20, and also to peak selector 17.

The difference amplifier 20 comprises a double triode, the plate load circuits of which are statically balanced by means of balancing potentiometer 19 (see also Fig. 1), so that when the D.-C. inputs are equal, there is no output, but when they are unequal, the output is proportional to the direction and magnitude of the difference. A common cathode resistor 37 is used in the difference amplifier of a value to provide substantial cathode voltage degeneration, which tends to stabilize both halves of the difference amplifier tube and to minimize differences due to any other factor than the applied D.-C. voltages.

The difference plate voltage is applied to the relay winding 38, to close the circuit from line 39 to either line 40 or 41, depending on the direction of the difference in peak voltages applied to amplifier 20. This in turn causes servo motor 21 to run in the proper direction to reduce the difference in peak voltages. This is accomplished by a mechanical connection between the motor and the variable inductance 25 of the interstage transformer 22 of cascaded amplifier 5, which changes the "tilt" of the system in the desired direction. When the "tilt" has been changed sufficiently to equalize channels 2 and 6, relay 42 is no longer energized and releases armature 43, which again floats between contacts 44 and 45 to deenergize the servo motor circuit. In practice, the servo motor is geared to the movable element of inductor 25 through a highly stepped-down gearing (not shown) so that it takes approximately twelve minutes for the servo motor 21 to go through the whole range of adjustment. This is desirable because the temperature changes, which cause the variations in attenuation of the coaxial television transmission line, are very slow in action, having in effect a very long time constant; and by matching the time constant of the servo mechanism to that of the transmission line, all short-time noises and disturbances of the system are rendered ineffective to produce any appreciable effect on the operation.

Since relay 42 is a polarized relay with two contact positions and an intermediate open circuit position, there tends to be a region of uncertainty, when the relay is just about to make or break, which would cause undesirable arcing or sparking and which might interfere with the normal operation of the system. To prevent this, a "hold" circuit, 46, is provided so that once contact has been made, a portion of the A.-C. voltage on line 40 or 41 (whichever is energized) is rectified at 47 or 48, and passes through the relay coil to hold it locked, and likewise to prevent unlocking until the magnetic force of the armature is sufficient so that the opening action is clean and decisive, without bouncing or sparking. The same result can be accomplished in other ways, e.g., by using a magnetic pole near each fixed contact of the relay, as is well-known. To further suppress arcing noises in the circuit, to which this system is inherently sensitive because of the high gain of the amplifier, suppressor condensers, 49, 50, are connected across the relay contacts as shunt capacitors to damp the RF arcing oscillations.

The above described circuit maintains relative equality between channels 2 and 6, and thus corrects for unbalanced frequency attenuation, but it is also necessary, for satisfactory operation, to insure that the absolute level of the output at terminal 7 remains constant. This is effected by the peak selector circuit 17 (see also Fig. 1). This circuit uses the output of the peak detector circuit to control the gain of bias amplifier 18 which in turn is used to control the bias of cascaded amplifier 5 so as to maintain the output at terminal 7 at a constant level, this constituting an automatic gain control circuit. It should be noted that the gain required of the transmission line amplifier system 4, 5, 6, is a function of the input signal, since it is required to hold the output at a constant level. The peak detector system 13 supplies two D.-C. voltages which are proportional to the carriers of channels 2 and 6 respectively, however, to control the transmission line amplifier, only one voltage is needed. Therefore, the peak selector circuit 17 selects the higher of the two voltages and uses it to control the bias load. This is accomplished by the double diode 51, the output filter circuit of which, 52, is charged to the highest received voltage from the double peak detector 13, and this voltage controls the bias on tube 53 of bias amplifier 18, which is shown arranged as a cathode follower and serves as a low impedance power input on line 54 to control the grid bias of the various stages of cascaded amplifier 5, as shown. This arrangement also provides a relatively low impedance bias test point 55, which permits the use of inexpensive low impedance voltmeters for service checking in the field, instead of requiring a high impedance electronic voltmeter.

It will be seen that the above system provides a constant maximum amplifier output, and since the channel "tilt" correction brings the low channel up very close to the high channel, a uniform level of output is attained, which is the desired result, regardless of variations in attenuation of the transmission line.

In the event that one of the reference channels 2 or 6 goes off the air before any of the others, it is desirable to have a standby constant amplitude oscillator at the antenna site to supply the missing carrier frequency, which may be done either automatically or manually. Alternatively, instead of using the channels 2 and 6, two pilot carrier oscillators of difference frequencies from any used for picture transmission may be employed to provide the reference points.

It will be apparent that the embodiments shown are only exemplary and that various modifications can be made in construction and arrangement within the scope of the invention as defined in the appended claims.

We claim:

1. In combination with a transmission line for transmitting a number of television channel signals of different frequencies including a combination of modulated carriers, each said channel signal comprising a synchronizing signal of a relatively constant high amplitude, means for compensating for the variable frequency attenuation of said line comprising an amplifier having an input terminal connected to said line for receiving signals therefrom, said amplifier having adjustable means for changing the slope of the frequency characteristic of the amplifier, means for sampling two different frequency signals received from said line, means for comparing the relative peak amplitudes of said sampled signals corresponding to the levels of said synchronizing signals and producing an electrical output which is a function of the difference of said amplitudes, and means controlled by the arithmetical value and algebraic sign of said difference for controlling said adjustable means in a direction to reduce said amplitude difference, and further means selectively responsive to the amplitude of the higher valued one of said sampled signals for controlling the amplitude of the output of the composite television channels.

2. In combination, a master receiving antenna for receiving a number of different television channel signals each including a synchronizing signal of a relatively constant high amplitude, amplifier means for amplifying all of said received signals to a common level, a coaxial cable transmission line fed by said amplifier means and having the characteristic of attenuating high frequency signals more than lower frequency signals, said attenuation being different at different times; a repeater amplifier fed by said transmission line, said repeater amplifier comprising a low-noise amplifier section, a further section fed by said repeater section and having adjustable means for changing the slope of its frequency characteristic, and a high-gain distributed amplifier section fed by said further section; means for sampling the amplitude of a high frequency carrier signal in said distributed amplifier section, and means for sampling the amplitude of a lower frequency carrier signal in said distributed amplifier section, said sampling means comprising a circuit for each signal tuned to the frequency of its respective signal, and a peak detector circuit for each sampled signal, whereby two direct current voltages are produced corresponding to the peak amplitudes of the respective synchronizing signals; a second peak detector means fed with both said peak signals to produce an output determined by the larger of said signals; a bias amplifier controlled by said last output to supply a bias voltage to said repeater amplifier to control the gain thereof so as to produce a constant maximum output of said repeater amplifier; a difference amplifier also fed with both said peak signals to produce an output which is a function of the difference of said peak signals; and a servomechanism controlled by said last output for actuating the adjustable means of said variable-tilt section in a direction to reduce said difference.

3. In combination with a transmission line for transmitting a number of television channel signals of different frequencies each said channel comprising a synchronizing burst of a relatively high constant amplitude modulating its channel frequency, means for compensating for the variable frequency attentuation of said line, comprising an amplifier having an input terminal connected to said line for receiving signals therefrom, said amplifier having adjustable means for changing the slope of the frequency characteristic of the amplifier, means for sampling two different television channels received from said line, peak detector means for comparing the relative peak amplitudes of said synchronizing bursts, one responsive to each one of said two different frequency signals for producing respective outputs related only to the respective peak value components of said two different frequency signals, and for suppressing all low amplitude components of said signals, means for comparing said respective outputs and producing an electric output signal which is a function of the amplitude difference of only said synchronizing burst modulation, and means controlled by the arithmetical value and algebraic direction of said difference for controlling said adjustable means in a direction to reduce said difference, and further means selectively responsive to the peak amplitude of the more powerful one of said sampled signals for controlling the gain of said amplifier to maintain the amplifier output at a constant level, said further means being responsive to the peak amplitude of the higher valued of said two signals.

References Cited in the file of this patent

UNITED STATES PATENTS

| | | |
|---|---|---|
| 1,743,132 | Green | Jan. 14, 1930 |
| 2,379,744 | Pfleger | July 3, 1945 |
| 2,550,595 | Pfleger | Apr. 24, 1951 |
| 2,576,249 | Barney | Nov. 27, 1951 |
| 2,578,836 | Potter | Dec. 18, 1951 |
| 2,604,587 | Lyons | July 22, 1952 |
| 2,719,270 | Ketchledge | Sept. 27, 1955 |
| 2,798,900 | Bradley | July 9, 1957 |

FOREIGN PATENTS

| | | |
|---|---|---|
| 14,845 of 1928 | Australia | May 20, 1929 |